United States Patent [19]

Schönhut

[11] 4,277,151
[45] Jul. 7, 1981

[54] METAL FRAME FOR EYEGLASSES

[75] Inventor: Kurt Schönhut, Schwäbisch Gmünd-Wetzgau, Fed. Rep. of Germany

[73] Assignee: Ferdinand Menrad, Schwäbisch Gmünd-Bettringen NW, Fed. Rep. of Germany

[21] Appl. No.: 944,671

[22] Filed: Sep. 22, 1978

[30] Foreign Application Priority Data

Nov. 7, 1977 [DE] Fed. Rep. of Germany ....... 2749796

[51] Int. Cl.³ .............................................. G02C 13/00
[52] U.S. Cl. ......................................... 351/41; 351/90
[58] Field of Search ............ 351/141, 142, 178, 68–93, 351/100–106, 52–58; 2/13, 14

[56] References Cited

U.S. PATENT DOCUMENTS

| | | | |
|---|---|---|---|
| 2,272,782 | 2/1942 | Styll | 351/93 |
| 2,337,560 | 12/1943 | Kimmel | 351/93 |
| 2,355,053 | 8/1944 | Carlson | 351/104 |
| 2,385,693 | 9/1945 | Cozzens et al. | 351/93 |
| 2,939,168 | 6/1960 | Ferron | 351/121 |
| 3,285,688 | 11/1966 | Weiszeck | 351/41 |
| 3,874,775 | 4/1975 | Lazarus | 351/41 |

FOREIGN PATENT DOCUMENTS

| | | | |
|---|---|---|---|
| 324337 | 6/1930 | United Kingdom | 351/41 |
| 820331 | 9/1959 | United Kingdom | 351/104 |

*Primary Examiner*—John K. Corbin
*Assistant Examiner*—B. W. de los Reyes
*Attorney, Agent, or Firm*—Allison C. Collard; Thomas M. Galgano

[57] ABSTRACT

A metal frame for eyeglasses is provided which includes a pair of rims, each of which is configured to surround and support an eyeglass lens, and a locking bar secured to each of the rims. The locking bar and the rim to which it is secured are separated by a separation slot so as to divide the rim and the bar into first and second rim portions and first and second locking bar segments respectively. A jacket having an internally threaded bore is coupled to the first locking bar segment to prevent movement thereof relative to the first locking bar segment towards the second locking bar segment, and a locking bar screw is detachably coupled to the second locking bar segment and is in threaded engagement with the bore of the jacket.

8 Claims, 4 Drawing Figures

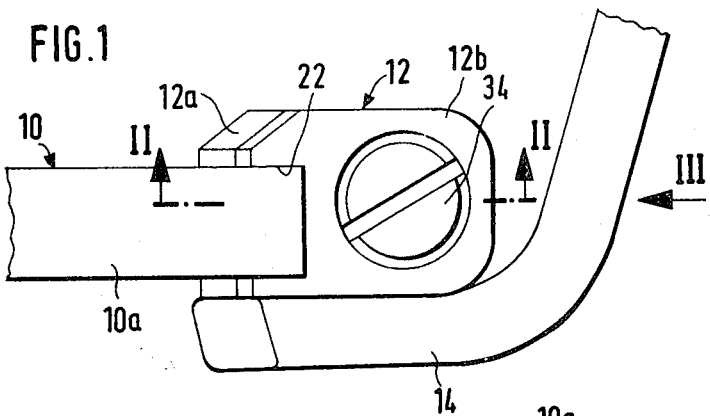
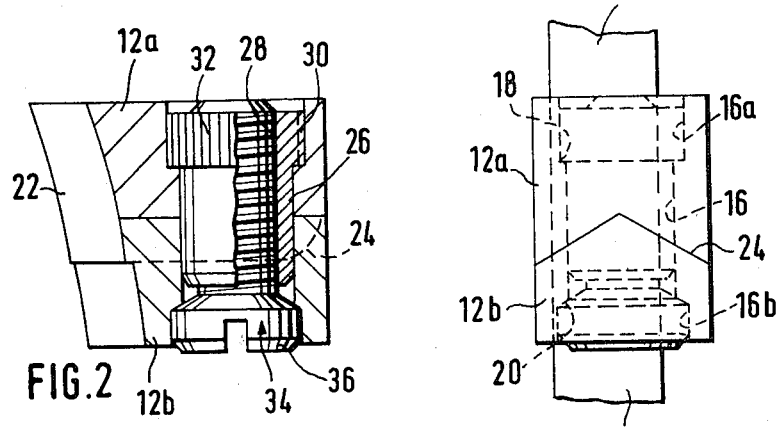
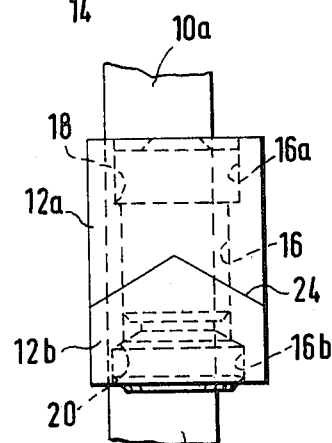
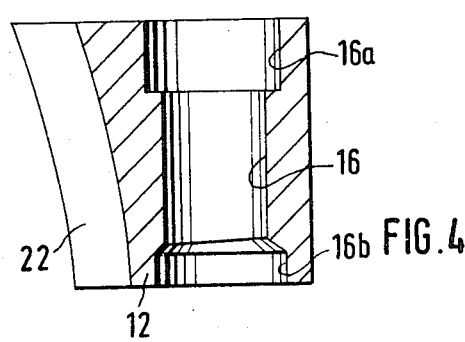

METAL FRAME FOR EYEGLASSES

The subject invention relates to a metal frame for eyeglasses. More particularly, it relates to such an eyeglass metal frame having a locking bar mounted on each lens rim, wherein the lens rim and the locking bar are separated by a separation slot, and wherein both portions of the lens rim and both segments of the locking bar are clamped together by means of a locking bar screw.

The locking bar is soldered onto the lens rims and is subsequently cut open or slotted together with the lens rim, so that the lens rims may be widened for inserting the eyeglass lens and so that it may be subsequently closed around the eyeglass lens by insertion of the locking bar screw.

In the known locking bar structure, the thread for the locking bar screw is cut into the still uncut or closed locking bar and the locking bar is subsequently soldered and finally slotted or cut open. The cutting operation results in the formation of edges or ridges which requires an aftercutting of the thread. The aftercutting of the thread is not only an additional operating step, but also results in undesirable tolerances.

Since the temple portion or ear supported side arms of the eyeglass frame is soldered together with the lens rims in the range of the locking bar, a two-time heating takes place in the range of the locking bar, so that the locking bar thread is present in the soft, heated material which is a further disadvantage of the known structure.

It is therefore an object of the subject invention to improve a metal frame for eyeglasses of the aforementioned type in that the clamping of the locking bar may be carried out with a thread of high precision, whereby an aftercutting of the thread after the separation cut and an impairment of the thread due to the soldering operation in the range of the locking bar is eliminated.

This object of the invention is obtained in that a jacket or casing having an inner thread is coupled with a first locking bar segment in such a way so as to prevent movement thereof relative to the first locking bar segment towards; the second locking bar segment, and wherein the locking bar screw is mounted on the other locking bar segment and is in threaded engagement with the jacket.

The inventive structure is advantageous in that the thread is mounted in a structural part which is insertable into the locking bar after the cutting and soldering steps, so that it is not influenced by either the cutting operation or the soldering operation. Furthermore, the jacket may be made of a very hard material.

An advantageous embodiment of the invention employs a jacket for engaging both locking bar segments. Thereby, a centering of the two locking bar segments in axial direction of the thread is obtained, in contrast to the known structure.

In a further advantageous embodiment of the invention, the jacket is secured against turning by a circumferential segment which is positively in engagement with the first locking bar segment.

In a still further advantageous embodiment of the invention, the jacket is partly slotted for securing the screw and is spread apart by the locking bar screw.

In a further advantageous embodiment of the invention, the locking bar is provided with an asymmetric bore for securing the screw.

Other objects and features of the present invention will become apparent from the following detailed description when taken in connection with the accompanying drawing which discloses several embodiments of the invention. It is to be understood that the drawing is designed for the purposes of illustration only, and is not intended as a definition of the limits and scope of the invention disclosed.

In the drawing, wherein similar reference numerals denote similar elements throughout the several views:

FIG. 1 is a fragmentarily-illustrated, bottom plan view of an eyeglass metal frame embodying the present invention in the range of the locking bar;

FIG. 2 is a sectional view, in part elevation, taken along line II—II of FIG. 1;

FIG. 3 is a side elevational view taken in the direction of the arrow III in FIG. 1; and FIG. 4 is a sectional view of the locking bar with an asymmetrical bore.

Referring now in detail to the drawing, a right eye lens rim 10 of a metal frame is shown in FIG. 1, with a soldered-on locking bar 2 and a temple portion or rearwardly projecting side arm 14 of the right eyeglass frame which is also coupled with the locking bar 12 and as later explained in more detail, is coupled with one of the two locking bar segments and thereby with the lens rim.

For reasons of clarity, the lens rim 10 is omitted in FIG. 2 as well as the temple portion 14, and in FIG. 3 the temple portion 14 is omitted.

A locking bar 12 is provided with a through bore 16 having expanded cross sectional segments 16a, 16b on both ends thereof so that engagement shoulders 18, 20 are formed. Locking bar 12 having bore 16 is soldered to lens rim 10, and it is provided with a groove 22 for properly seating lens rim 10. After the lens rim and the locking bar are soldered together, locking bar 12 and lens rim 10 are separated by a V-shaped cut or slot 24 (FIG. 3) so that the lens rim forms a slotted ring in the range of locking bar 12 which can be widened for inserting an eyeglass lens. The cut 24 separates the lens rims and locking bar 12 into an upper lens rim portion 10a, coupled to an upper locking bar segment 12a and a lower lens rim portion 10b coupled to a lower locking bar segment 12b. The temple portion 14 of the bow of the eyeglasses is soldered to the upper locking bar segment 12a and/or with the upper lens rim portion 10a, after the cut was made, so that the bow or side arm together with the upper portion 10a and segment 12a of the lens rim and the locking bar respectively, can cooperate during the opening and closing movement when inserting the eyeglass lens.

After finishing the soldering and cutting operations, a steel jacket 26 (FIG. 2) is inserted into bore 16. The jacket 20 is provided with an inner thread 28 and a shoulder 32 having a milled edge 30 on one end, so that the shoulder 32 may abut a further shoulder 18 in the upper locking bar segment 12a. The milled edge 30 prevents jacket 26 from turning in bore 16, since it positively engages the adjacent wall of bore 16 when jacket 26 is pressed into bore 16.

Instead of the milled edge 30, jacket 26 may also have a non-round shoulder, for example, a square shoulder which cooperates with a correspondingly shaped segment of bore 16, for preventing a turning of jacket 16. This is particularly advantageous when jacket 26 is not pressed into bore 16, but is received in bore 16 with a little free play which is required when the jacket is made from a spring elastic material, is at least partly slotted and has a slightly smaller inner diameter or inner cross section, than the cross section of the locking bar screw 34. As a result, the locking bar screw is secured due to a spreading apart of jacket 26 (this being permitted by the slot formed therein).

Locking bar screw 34 serves to clamp or lock the two locking bar segments 12a and 12b against each other and is provided with a screw head 36 which engages shoulder 20. FIG. 3 does not show the locking screw 34, so that the cross sectional view of bore 16 can be seen more clearly.

Due to the V-shaped cut 24, the lens will lie in the same plane as the lens rim 10 when screw 34 is fastened. An exact centering of the upper and lower locking bar segments 12a and 12b with respect to the screw axis is effected by jacket 26 which engages the segments of the bore 16 in the upper locking bar segment 12a and the lower locking bar segment 12b. Due to jacket 26 a hitherto unknown thread length is obtained with respect to the known structures, so that the engagement and the effect of the locking bar screw and thereby the framing of the eye glass lenses is more secured.

Instead of providing a turn-proof seat for jacket 26 and turning the screw, the thread engagement may also be generated by, for example, in profiling shoulder 32 and in effecting a corresponding profiling of screw head 36, so as to secure the screw against turning and make the jacket 26 turnable in such a way that it may be engaged by a turning tool.

The securing of the screw may also be obtained in various ways, for example, locking bar 12 may have an asymmetric bore for this purpose which is arranged in such a way that the bore segment 16b which receives the screw head 36 is eccentric with respect to the segment which receives jacket 26, so that a radially-directed pressure between the screw shank and the screw head and a friction fit between the screw head 36 and the bore segment 16b is generated when segment 16b is dimensioned to correspond to the diameter of the screw head 36. Such a locking bar is shown in FIG. 4 before the coupling with the lens rim and the separation by cut 24.

While only a few embodiments of the present invention have been shown and described, it will be obvious to those persons of ordinary skill in the art that many changes and modifications may be made thereunto without departing from the spirit and scope of the invention.

What is claimed is:

1. A metal frame for eyeglasses comprising:
 a pair of rims, each of which is configured to surround and support an eyeglass lens;
 a locking bar having a bore extending therethrough secured to each of said rims, said locking bar and said rim to which it is secured being separated by a V-shaped separation slot so as to divide said rim and said bar into first and second rim segments and first and second locking bar segments respectively, said second locking bar segment having an abutment adjacent to an end thereof distal from said first locking bar segment;
 a jacket having an internally threaded bore which is, in turn, received in at least said bore of said locking bar encompassed by said first locking bar segment thereof and which is coupled to said first locking bar segment to prevent movement thereof, relative to said first locking bar segment, towards said second locking bar segment; and
 a locking bar screw having a head portion and a threaded shaft, the former of which is in abutting engagement with said abutment of said second locking bar segment and the latter of which is inserted through said distal end of said second locking bar segment so as to be in threaded engagement with said bore of said jacket and so as to thereby detachably secure said first and second locking bar segments together.

2. The metal frame according to claim 1, wherein said jacket has a circumferential section which is in positive engagement with said first locking segment so as to prevent turning thereof.

3. The metal frame according to claim 1, wherein said jacket is at least partially slotted to permit expansion thereof when said screw is threaded therein.

4. The metal frame according to claim 1, wherein said locking bar is provided with an assymetrical bore for receipt of said screw and wherein said bar bore is provided with a bore segment which is dimensioned and configured for receipt of a screw head of said screw, said bore segment being eccentrically arranged with respect to the remainder of said bar bore.

5. The metal frame according to claim 1, wherein said jacket engages both of said locking bar segments.

6. The metal frame according to claim 5, wherein said jacket centrally aligns both of said locking bar segments.

7. The metal frame according to claim 1, wherein said jacket has an expanded head portion at one end thereof which defines a shoulder adjacent thereto and wherein said first locking bar segment has an expanded bore segment which defines an abutment adjacent thereto configured for mating abutting engagement with said shoulder of said jacket so as to thereby effect coupling of said jacket to said first locking bar segment to prevent movement thereof, relative to said first locking bar segment, towards said second locking bar segment.

8. The metal frame according to claim 1, wherein said jacket is made from steel.

* * * * *